Aug. 4, 1970  R. HEPP  3,522,942
METHOD OF AND APPARATUS FOR STUFFING BUNDLES OF PRINTED MATTER
Filed Dec. 14, 1967  4 Sheets-Sheet 1
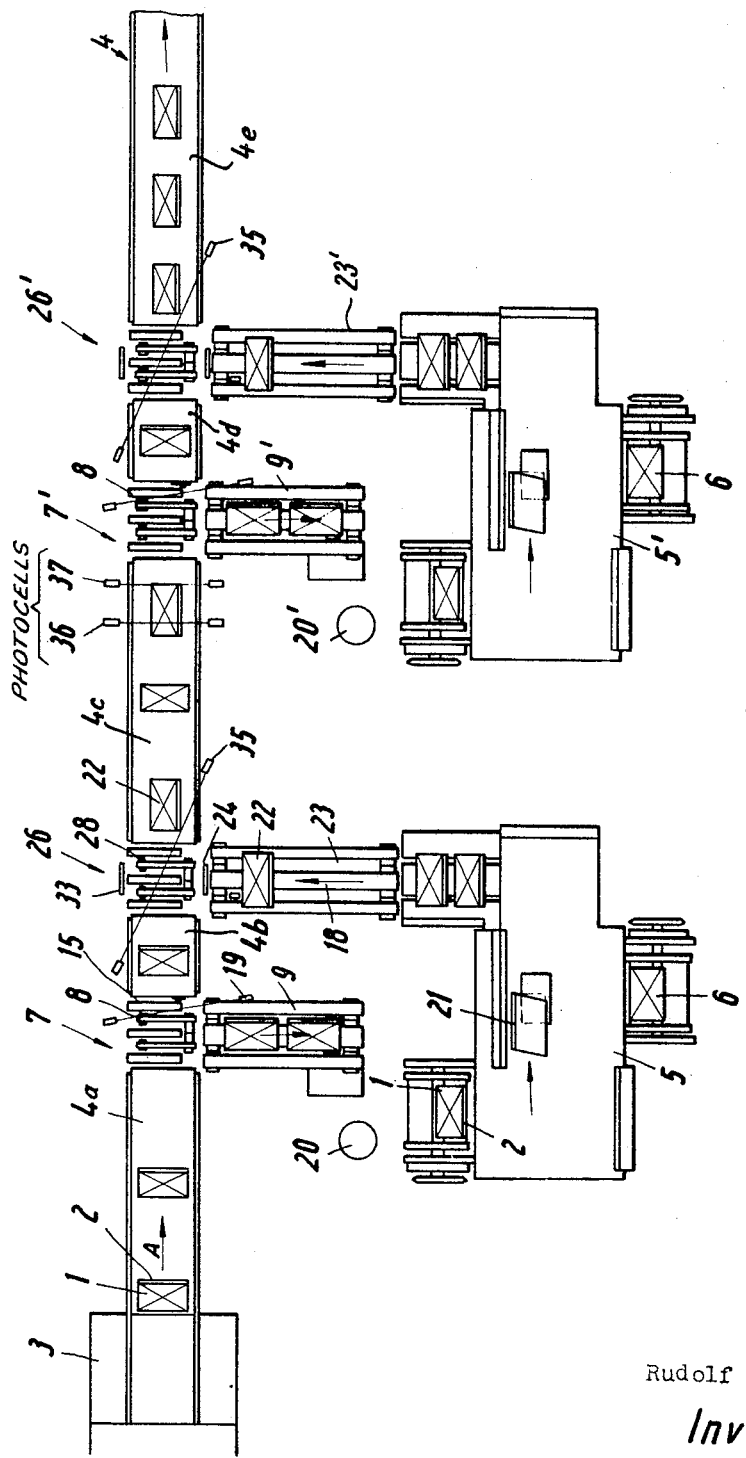
Rudolf HEPP
Inventor:
Karl J. Ross
Attorney

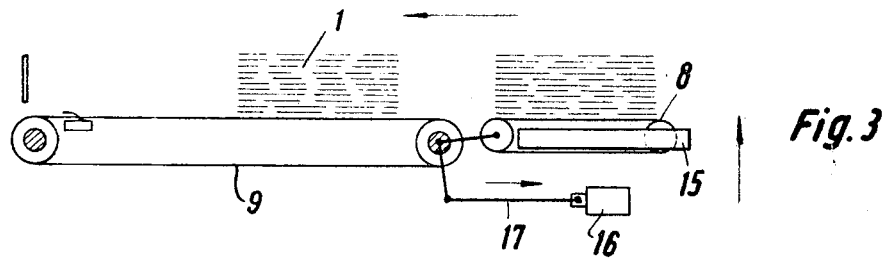
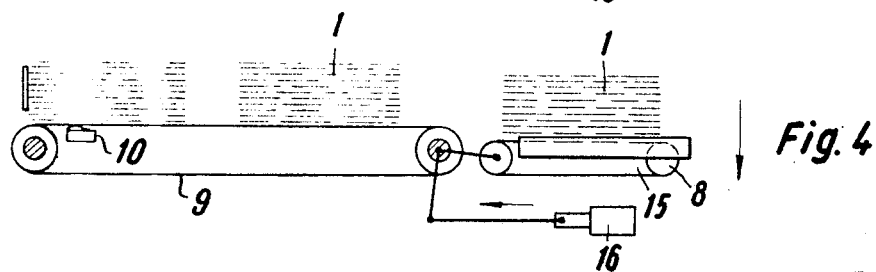
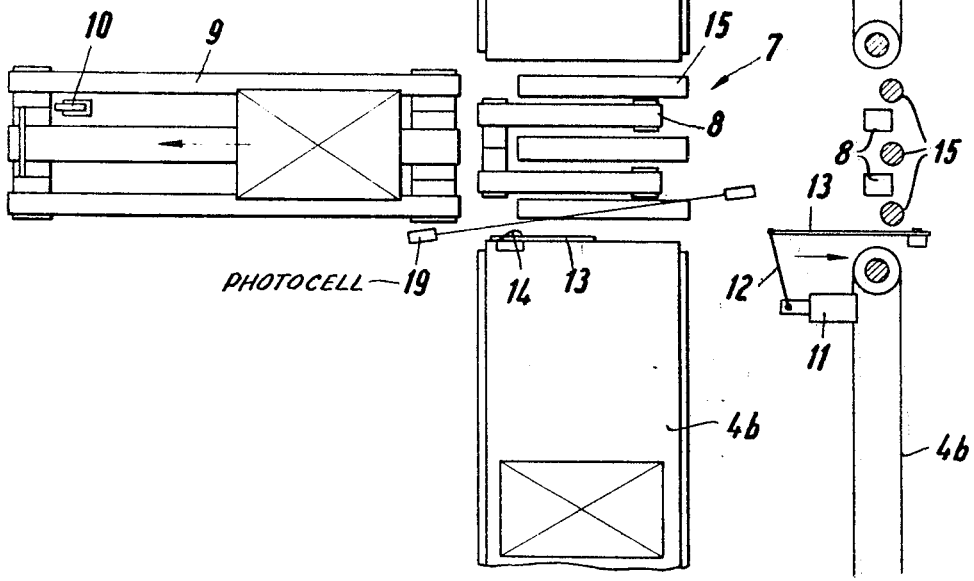

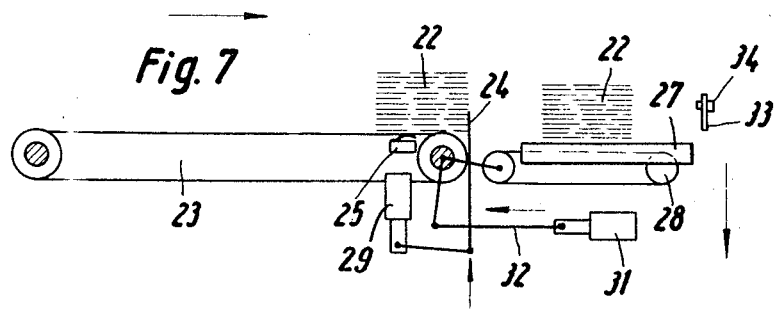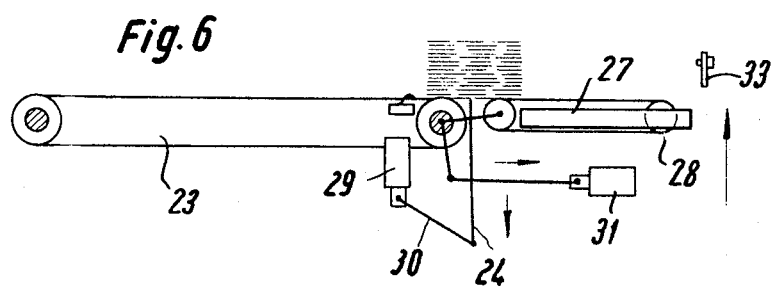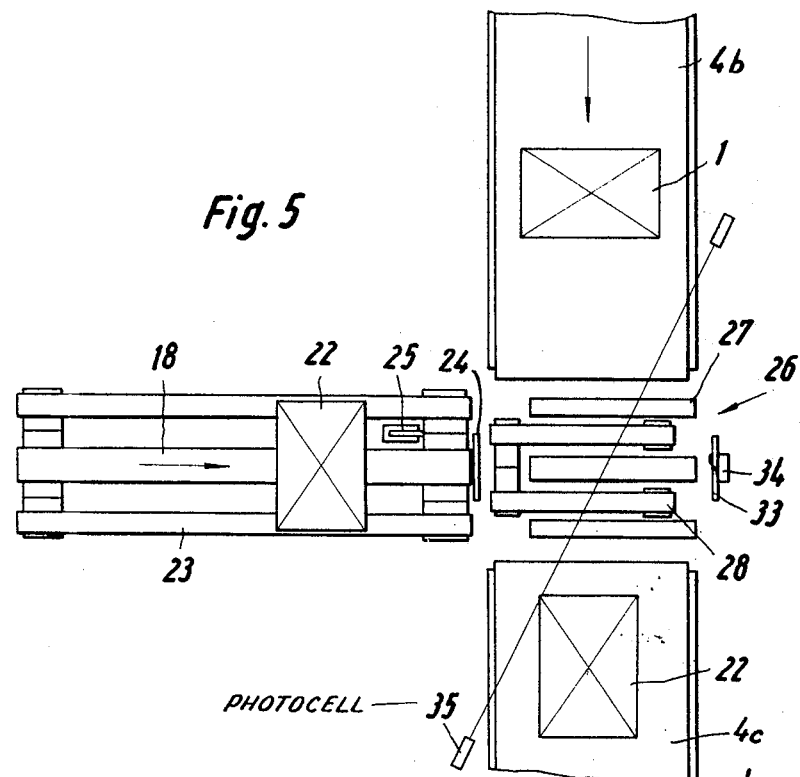

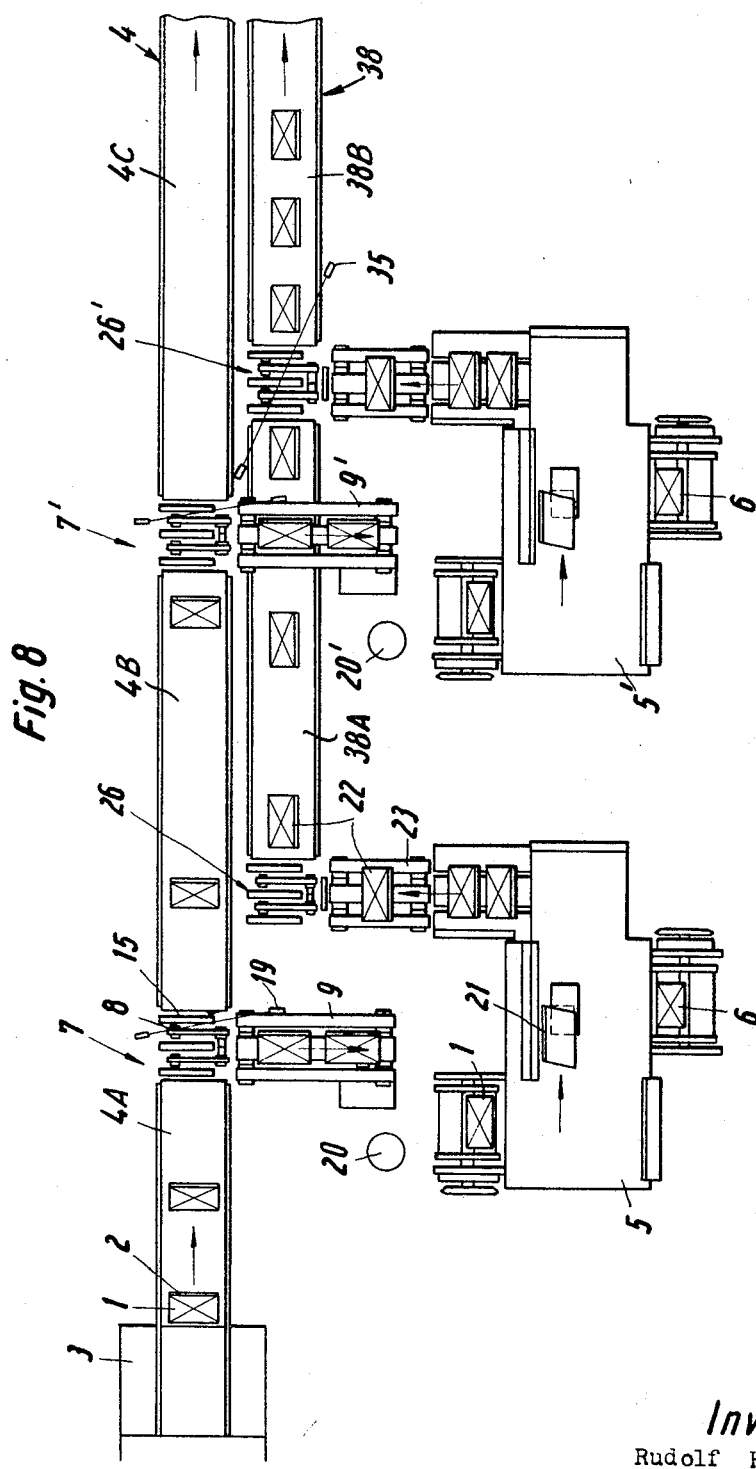

United States Patent Office 3,522,942
Patented Aug. 4, 1970

3,522,942
METHOD OF AND APPARATUS FOR STUFFING BUNDLES OF PRINTED MATTER
Rudolf Hepp, 7a Schmidt-Ott-Strasse,
Berlin 41, Germany
Filed Dec. 14, 1967, Ser. No. 690,444
Claims priority, application Germany, Mar. 8, 1967,
H 62,051
Int. Cl. B65h *5/30;* B23q *5/22;* B65g *47/00*
U.S. Cl. 270—55                                                16 Claims

ABSTRACT OF THE DISCLOSURE

Bundles of printed matter coming from a printing press are transported along a main conveyor from which several transverse conveyors lead to respective processing machines designed to stuff inserts into these bundles. Each transverse conveyor has an outgoing line, branching off the main conveyor at an entry junction, and a return line, leading back to the main conveyor at an exit junction. A stop at the first entry junction is engageable by an oncoming bundle to deviate same onto the corresponding outgoing line if no other bundle is waiting for processing at the end of that line; otherwise, a switch at that end retracts the stop to let the bundle move on to the entry junction associated with the next processing machine.

---

My present invention relates to a method of and apparatus for putting inserts into printed publications such as newspapers, magazines or the like, the printed material being deposited in a series of bundles on transport means, e.g. a conveyor belt.

Devices are known for placing inserts in newspapers and magazines, and for the assembling of magazine sections, whereby the assembled magazine sections can be bound together and trimmed. This type of insertion machine or apparatus for the assembly of newspaper or magazine sections is used particularly when the printing capacity of the associated printing machine does not suffice to print the newspaper or magazine in a single operation. For newspapers it is therefore convenient to provide so-called pre-printed material for automatic insertion into the main body of printed material. It is also frequently necessary to place in newspapers or magazines printed inserts which have been produced by another printing system. Thus, for example, in newspapers which are produced by letterpress printing or in magazines which are printed in gravure there can be inserted enclosures printed as desired in offset, letterpress or gravure after which trimming or a similar operation takes place.

The printed sheets coming from the printing press are assembled in bundles by hand or by means of an additional stacking apparatus, these bundles being then deposited on a conveyor belt. This freshly printed material must be conveyed, after assembly, to the insertion machines so that the bundles can be supplied with the material to be inserted. The transporting of the bundles from the conveyor belt associated with the printing press to the insertion machine generally requires additional personnel. To this is added the fact that the printing press has to operate continuously, while the insertion machines cannot do so since they must be periodically stopped for operational reasons.

An object of my present invention is to attain a method of operation in which the newspaper or magazine bundles are automatically provided with inserts without an additional conveying path, and without the need for an interruption of the work of the printing presses. For this purpose it is necessary that the bundle on the conveyor belt be received by the insertion machine and processed without allowing any accumulation at the printing press to occur. This is achieved by the method according to the invention, pursuant to which the bundles carried by the conveyor belt are guided by lateral displacement via respective branch paths to a plurality of insertion or processing machines which are disposed in a row along the main transport path and which put the inserts into the printed publications, a given bundle on the conveyor belt being conveyed past any processing machine already occupied with bundles until it reaches a free processing machine to which it can be guided to this by lateral shift. According to a more specific feature of my invention, this transverse displacement of the bundles takes place in response to controlling or monitoring means associated with the processing machines. Thus, a continuous supply of bundles to the insertion machines is guaranteed.

A further feature of the invention is that an individual bundle is first moved into a waiting position between the conveyor and a processing machine, from which it is called forth and passed to that machine when the same becomes free. This provision of a waiting position in which a single bundle is placed after its removal from the conveyor, and before it is guided to the insertion machine, enables the length of time necessary for the bringing of the bundle from the conveyor belt onto the insertion machine to be divided into two independent periods. Since the insertion machine calls the bundle from the conveyor belt by its own control means when no bundle is in the waiting position, successive bundles can be passed more quickly into the insertion machine because of the shorter path between insertion machine and waiting position.

A further important feature of the method according to the invention is that the processing machines associated with the conveyor belt are so adjusted in speed of operation that the total of the bundles which can be received by them is greater than the number of the bundles carried by the conveyor belt. In order to compensate for the periodic stopping of individual insertion machines and to guarantee a delivery without delay of the bundles of printed material from the conveyor belt, it is necessary that the insertion machines in their entirety have a surplus capacity, as compared with the printing press. The first machine in the row as seen in the direction of transport will be running at its full capacity. The same is the case with the next insertion machine, while for example the last one in a series of three machines is not running at full capacity since it has fewer bundles than it is in a position to process because of the surplus capacity given to the entirety of the insertion machines. For this reason at least the last machine is under-utilized and can call a bundle from the conveyor belt only when the preceding insertion machines are occupied during the conveying of this bundle. If, for example, a printing press produces 20,000 copies per hour, and three insertion machines rated for 10,000 copies per hour are working, then the first two machines cope with the whole output of the press. Only upon occasional stopping of one of these machines is the third machine, representing the surplus capacity, set in operation, since the stopped first or second insertion machine cannot take charge of these bundles. In this way it is guaranteed that all the bundles fed from the printing press can be processed without time wasting by the insertion machines.

A further feature of the method according to the invention is that the processed bundles are returned by the processing machines to the conveying path. Thus the bundles successively supplied to the conveying path are reunited after processing to a series of bundles fed at the end of the conveying system to a station for the final processing, e.g. packing, tying and the like. A preferred mode of operation according to the invention involves manual feed-out of the substantially rectangular bundles, deposited on the conveyor belt with their folded edges lying to the front in the direction of travel, from their waiting position with a 90° swing into the processing machines, with the folded edges again facing forwardly and returned thereafter from the machines in their rotated position onto the conveyor belt or onto an additional conveyor system adjacent thereto. By the intervention of an operator for transferring the unprocessed bundle from the waiting position to the processing machine, a substantial simplification of the operating procedure is achieved. By its 90° rotation the bundle is inserted into the processing machine with the folded edge in the correct position for introduction of the inserts. As the processed bundle is returned to the conveyor belt in its rotated position for transportation to the following processing station, e.g. for packing, it can be immediately recognized at that station whether the incoming bundle has or has not been stuffed.

The apparatus serving for carrying out the method is characterized in that with each processing machine there is associated an entry switch lying in the path of travel and having a stop member which is capable of being swung into that path between adjoining conveyor-belt sections to arrest a bundle thereon when in a blocking position; the stop member controls an actuating device, e.g. a magnet, for lifting a set of transverse bands above the conveyor belt to intercept an approaching bundle at the junction with a branch line whose end carries an exit switch which, upon the arrival of a bundle, de-energizes a detent means, e.g. a magnet, holding the stop member in its blocking position.

A further important feature consists in the fact that there is provided beyond the entry switch a photoelectric detector whose output controls the exit switch of the branch line to prevent the stop member from returning to its blocking position upon the passage of a bundle.

In a system including an additional conveyor means receiving the processed bundles, the exit switches are advantageously arranged in this additional conveyor means.

According to a more particular feature of my invention I provide in the transport path, ahead of the second and each following processing machine, discriminator means in the form of two photoelectric detectors disposed parallel to one another and at right angles to that path, the distance between these detectors being larger than the width of the unprocessed bundles; upon simultaneous interruption of their light paths through a processed bundle, they activate a time switch keeping the stop bar of the entry switch depressed during transit of the bundle.

The accompanying drawing shows, by way of example, embodiments of the apparatus according to the invention. In the drawing:

FIG. 1 is a diagrammatic representation of an apparatus according to the invention with a single main conveyor;

FIGS. 2 is a plan view of part of the apparatus of FIG. 1, including a section of a conveyor belt with an entry switch and an adjoining branch line leading to a processing machine;

FIG. 2A is a side view of the assembly of FIG. 2;

FIG. 3 is a side view of the branch line and of the switch of FIGS. 2 and 2A with a raised bundle;

FIG. 4 is a view similar to FIG. 3 with the bundle lowered;

FIG. 5 is a plan view of a section of the conveyor belt with an ancillary conveyor belt leading from the processing machine and with an exit switch;

FIG. 6 shows the conveyor belt and the exit switch of FIG. 5 in side view with the bundle raised;

FIG. 7 is a view similar to FIG. 6 with the bundle lowered; and

FIG. 8 is a view similar to FIG. 1 with an additional conveyor for receiving the bundles discharged from the processing machines.

FIG. 1 shows a diagrammatic plan view of the apparatus according to the invention equipped with two processing machines. Successive newspaper bundles 1 are fed, with their folded edges 2 to the front in the direction of travel, from the delivery end of a printing press 3 in the direction of arrow A onto a conveyor 4, consisting of several belt sections 4a–4e, on which they are transported further. Two processing machines 5 and 5', arranged on a line parallel of that direction, are associated with the conveyor 4. Each processing machine 5, 5', containing inserts 6 to be put into the bundles, is served by a respective entry switch 7, 7' lying in one of the gaps between conveyor sections 4a, 4b and 4c, 4d. Each switch 7, 7' comprises several transport rollers 15, lying in the plane of the conveyor 4, and a pair of transport bands 8 (best seen in FIGS. 2 and 2A) oriented transversely to the conveyor 4 and capable of being raised and lowered. When, as indicated in FIGS. 1 to 4, a bundle 1 on the conveyor 4 encounters the entry switch or junction 7, it engages a stop member 13 or gate which projects above the conveyor surface. The stop member 13 carries a sensing switch 14 which, when contacted by the bundle, actuate a magnet 16 which, through a connecting rod 17, lifts the travel bands 8 out of the depressed position shown in FIG. 4 into the elevated position of FIG. 3, so that the bundle 1 is lifted off the carrier rollers 15 and passed by the rotating bands 8 onto an outgoing lateral conveyor or branch line 9. The bundle 1 then moves to the end of the branch line 9, where it is stopped. A switch 10 is thereby actuated which de-energizes a magnet 11 whereby, through a connecting rod 12, the stop member 13 is lowered beneath the plane of the conveyor belt 4, so that a bundle 1 following behind passes through the entry switch 7 and can advance to the following entry switch 7' assigned to the second machine 5' so as to be processed in the latter. When an operator at a post 20 takes the bundle 1 out of its waiting position on the branch line 9, the switch 10 is released and re-energizes the magnet 11 so that the stop member 13 re-enters the conveyor path and stops the next bundle 1, and in the manner indicated above allows it to be passed onto the branch line 9 where it once again trips the switch 10 at the waiting station formed by the end of this line.

The operator at post 20 takes hold of the bundle 1, lying on the branch line 9, in such a way that the folded edges 2 are turned away from his body; he then turns through 90° and inserts the bundle 1 by hand into the processing machine 5 as indicated in FIG. 1. In the processing machine the magazines are opened by a spreader 21 and the inserts 6 are placed inside. The bundle processed in this way arrives at the exit of the processing machine 5.

At that exit there is arranged a subsidiary conveyor belt 23, oriented transversely to the main conveyor 4, which receives the processed bundle 22 and conveys it in the direction of the arrow 13 onto the main conveyor 4. Just ahead of the end of the conveyor 23 there is arranged a switch 25 and at that end itself there rises a stop member 24. The processed bundle 22 rides on the conveyor belt 23 towards the gate 24 and thereby actuates the switch 25 which energizes a magnet 29 which, through a rod 30, lowers the stop member 24 out of the path of the conveyor 23; the switch 25 actuates at the same time another magnet 31 which, through a rod 32, lifts a pair of endless bands 28 to the level of conveyor 4. The bands 28 are part of an exit switch or junction 26 adjoining the conveyor belt 23 while lying in the main conveyor 4. The bands 28 are located between transport rollers 27 which are arranged at the level of the main conveyor 4. When the magnet 31 is actuated by the switch 25 as shown in FIG. 6, the bands 28 are lifted above the plane of the rollers 27 and can take the bundle 22 from the subsidiary conveyor 23. The bundle 22 is moved on the bands 28 up to a stop plate 33 located at the end of the exit switch 26, extending parallel to the conveying direction of the main conveyor 4 and containing a switch 34 which, when actuated, returns the stop member 24 and the bands 28 into the normal position shown in FIG. 7.

In order to prevent the stop member 13 in the entry switch 7 from rising above the conveyor 4 upon the removal of a bundle 1 from the branch line 9 and the switch 10 in the presence of another bundle on junction 7, there is provided at that junction a photocell detector 19 whose light path traverses the entry switch 7, at its distal end, almost at right angles and which can be included, for example, in the circuit of the switch 10 for actuating the magnet 11; as the bundle 1 passes through the entry switch 7, this detector interrupts the circuit until this bundle 1 has again left the entry switch 7, whereupon the circuit of the switch 10 is closed and the stop member 13 can be restored to normal.

As shown in FIG. 5, the exit switch 26 has a photocell detector 35 crossing the exit switch diagonally to prevent a processed bundle 22 from being delivered by the return conveyor belt 23 to the exit switch or junction 26 when the latter has just been passed by an unprocessed bundle 1 along the main conveyor 4. For this purpose the detector 35 may be in circuit with the switch 25 and prevent the energization of the magnets 29 and 31 until the bundle 1 has passed the exit switch 26. During the passing of the bundle 1 through the exit switch 26 the stop member 24 and the bands 28 are held in the position shown in FIG. 7; after the bundle has cleared the exit switch 26, the light path of the photocell is no longer interrupted so that the magnets 29 and 31 are energized and the bundle 22 located at the stop member 24 can be conveyed onto the exit switch 26.

In the embodiment according to FIG. 1, the bundles 22 leaving the processing machine 5 are passed back through the exit switch 26 onto the section 4c of the main conveyor 4; this section carries both unprocessed bundles 1 having bypassed the first processing machine 5 and processed bundles 22 which are returned through the exit switch 26 of that machine to the conveyor 4. In order to prevent the bundles 22 already processed by the machine 5 from being routed to the next processing machine 5', there are arranged on the belt section 4c ahead of the entry switch 7' of the second processing machine 5', and similarly at the entry switches of any following processing machines, two photoelectric detectors 36 and 37 whose relative distance is so adjusted as to be greater than the width of the unprocessed bundles 1 but smaller than the length of the processed bundles 22. Both detectors 36, 37 can be, for example, connected in parallel and actuate a time switch when both light paths are simultaneously interrupted. This time switch, not shown, is in circuit with the magnet 11 actuating the stop member 13 of junction 7' and de-energizes this magnet for a certain period; thereafter the stop member 13 again enters the transport path of the conveyor 4 to deflect the following bundle 1 via branch line 9' toward the processing machine 5'. The associated operator's post, return conveyor, exit junction and photoelectric detector have been designated 20', 23', 26' and 35'.

In the modified embodiment shown in FIG. 8 there is provided a supplementary conveyor 38 (having belt sections 38A, 38B) which extends parallel to the main conveyor 4 (having belt sections 4A, 4B, 4C) and ends at the terminal processing station, e.g. the packing depot. In this embodiment there are carried on the main conveyor 4 only unprocessed bundles 1, and on the supplementary conveyor 38 only processed bundles 22. It is clear that in this embodiment the entry switches 7, 7' of the processing machines 5, 5' are located in the main conveyor 4, the exit switches 26 and 26' being located, on the other hand, in the supplementary conveyor 38. Advantageously, the supplementary conveyor belt 38 is arranged at a lower level than the main conveyor 4; it can also be desirable for the supplementary conveyor 38 to be arranged directly underneath the main conveyor 4, in which case the packing station can be provided with a hinged bridge which is engaged with the subsidiary conveyor 38 for the packing of processed bundles 22 and with the main conveyor belt 4 for the treatment of unprocessed bundles 1.

The apparatus according to the invention can be used as desired with unprocessed bundles 1 or with processed bundles 22; in the first case the processing machine 5, 5' can be disconnected together with their switches, so that the unprocessed bundles 1 are transported over the conveyor 4 to the packing station, whereas in the second instance the processing machines are operative whereby the processed bundles 22 are fed, according to FIG. 1, over the main conveyor 4 or, according to FIG. 8, over the supplementary conveyor 38 to the packing station.

What I claim is:

1. An apparatus for individually processing bundles of printed matter, comprising:

main conveyor means forming a transport path for successive bundles;

a plurality of processing machines disposed alongside said transport path;

a plurality of lateral conveyors forming entry junctions with said main conveyor means and extending therefrom to respective ones of said processing machines;

gate means at said entry junctions for deviating oncoming bundles onto the corresponding lateral conveyors;

and control means on at least the first of said lateral conveyors responsive to occupancy thereof by a deviated bundle for deactivating the corresponding gate means whereby subsequent bundles are guided along said transport path to the next entry junction for the duration of such occupancy.

2. An apparatus as defined in claim 1 wherein said first of said lateral conveyors forms a waiting station for deviated bundles, said control means comprising a switch at said waiting station.

3. An apparatus as defined in claim 1 wherein said entry junction comprises a transport band transverse to said path disposed in a gap between adjoining sections of said main conveyor means, said band being normally depressed below said path and being elevatable by said gate means for deflecting a passing bundle onto the corresponding lateral conveyor.

4. An apparatus as defined in claim 3 wherein said gate means comprises a stop member beyond said transport band normally projecting above said path and mechanism responsive to said control means for retracting said stop member below said path upon occupancy of said first of said lateral conveyors, said stop member being provided with sensing means actuatable by an approaching bundle for elevating said band.

5. An apparatus as defined in claim 4, further comprising photoelectric detector means at said entry junction for preventing a return of said stop member to its projecting position during passage of a bundle across said gap.

6. An apparatus as defined in claim 1 wherein each of said lateral conveyors comprises an outgoing line leading to the corresponding processing machine from said entry junction and a return line for delivering processed bundles to said main conveyor means at an exit junction.

7. An apparatus as defined in claim 6 wherein said return line is provided ahead of said exit junction with stop means normally positioned to arrest a processed bundle on said return line, further comprising switch means adjacent said stop means actuatable by such processed bundle for retracting said stop means, and photoelectric detector means at said exit junction for preventing retraction of said stop means during passage of another bundle across said exit junction.

8. An apparatus as defined in claim 6, further comprising discriminator means on said transport path ahead of said next entry junction for distinguishing between processed and unprocessed bundles, the gate means at said next entry junction being deactivatable by said discriminator means to give passage to processed bundles traveling along said path.

9. An apparatus as defined in claim 8 wherein said bundles are substantially rectangular and are received by said main conveyor means from said return line in a position offset by 90° from the position of unprocessed bundles, said discriminator means including a pair of photoelectric detectors interconnected to produce an output upon concurrent actuation and spaced along said path by a distance greater than the width but smaller than the length of said bundles whereby said detectors are concurrently actuated only by bundles oriented lengthwise along said path.

10. An apparatus as defined in claim 6 wherein said main conveyor means comprises a first set of conveyor-belt sections separated by the entry junctions and a second set of conveyor-belt sections separated by the exit junctions associated with said lateral conveyors whereby unprocessed bundles move along said first set and processed bundles move along said second set of sections.

11. A method of individually processing bundles of printed matter, comprising the steps of advancing successive bundles along a main transport path past a row of processing machines which are linked with said main path via respective branch paths, deviating an oncoming bundle at a junction of said main path with the first branch path onto the latter for processing at the first of said machines, and guiding subsequent bundles past said junction along said main path to a further junction leading to another branch path as long as said first branch path is occupied by a bundle deviated onto same.

12. A method as defined in claim 11 wherein each bundle processed at any of said machines is returned to said main path via the respective branch line.

13. A method as defined in claim 12 wherein processed bundles reaching said further junction are guided therepast to continue on said main path irrespectively of the occupied or unoccupied condition of said other branch path.

14. A method as defined in claim 13 wherein a bundle approaching a processing machine is characteristically repositioned to differ from unprocessed bundles upon returning to said main path.

15. A method as defined in claim 14 wherein the repositioning of a bundle involves a rotation thereof through 90°.

16. A method as defined in claim 11 wherein each branch path is provided with a waiting position in which a deviated bundle is held prior to being fed to the associated processing machine, subsequent bundles being guided past the corresponding junction at said main path during occupany of said waiting position by such deviated bundle.

References Cited

FOREIGN PATENTS 1,224,751   9/1966   Germany.

LAWRENCE CHARLES, Primary Examiner

U.S. Cl. X.R.

198—19, 20